June 20, 1967     M. J. NEITZEY, JR     3,326,573
DRAFT DEVICE OR TRAILER HITCH
Filed July 30, 1965
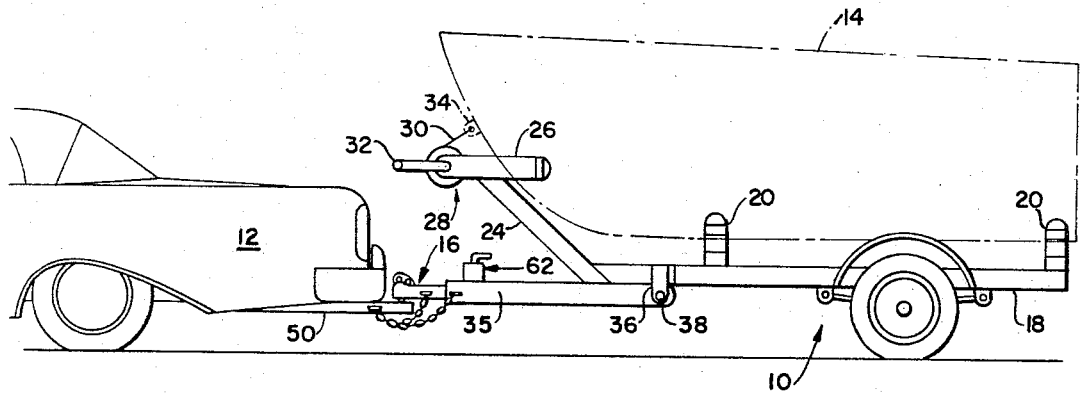
INVENTOR
Maurice Joseph Neitzey, Jr.
ATTORNEY

United States Patent Office 3,326,573
Patented June 20, 1967

3,326,573
DRAFT DEVICE OR TRAILER HITCH
Maurice Joseph Neitzey, Jr., North Miami, Fla.
(19915 NW. 3rd Court, Miami, Fla. 33169)
Filed July 30, 1965, Ser. No. 475,915
4 Claims. (Cl. 280—482)

This invention relates to draft devices or hitches and more particularly to a draft device or hitch for a vehicle such as a boat trailer.

When launching a boat from a trailer, it is desirable that the tongue of the trailer be relatively long so that the trailer and boat may be positioned in a body of water while the vehicle which tows the trailer remains on dry land.

It is also desirable, however, that the trailer tongue be relatively short when the vehicle is towing the trailer over land, to limit the overall length of the combined towing and towed vehicles and to increase the maneuverability and ease of towing.

It is also desirable, at least when launching the boat from the trailer, that the tongue of the trailer and the trailer body be capable of pivotal movement in a generally vertical plane relative to each other to enable the boat to be more easily launched from a relatively steep bank along the body of water.

It is therefore an object of this invention to provide a vehicle, such as a trailer, with an extensible tongue to permit the length thereof to be adjusted between extended and retracted positions.

A further object of this invention is to provide a vehicle, such as a trailer for towing boats or the like, with an elongate generally longitudinally extensible tongue to permit the length thereof to be adjusted between an extended position for facilitating in the launching of the boat therefrom and a retracted position for enabling the trailer to be towed.

Another object of this inveniton is to provide a vehicle, such as a trailer, with an elongate generally longitudinally extensible tongue to permit the length thereof to be adjusted between extended and retracted positions together with a bodily flexible stop member to limit the degree of extenison thereof.

Still another object of this invention is to provide a vehicle, such as a trailer for towing boats or the like, with an extensible tongue to permit the length thereof to be adjusted between extended and retracted positions with the tongue being pivotally mounted to the body of the trailer with the tongue being readily disassembled for painting, inspection, maintenance or other similar purposes.

Yet another object of this invention is to provide a vehicle, such as a trailer, with an elongate generally longitudinally extensible tongue to permit the length thereof to be adjusted between extended and retracted positions which is durable in use, reliable in operation, passes consumer appeal and is simple and inexpensive to produce and manufacture.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope of the subjoined claims.

In the drawing:

FIGURE 1 shows a towed vehicle, having a draft device trailer, constructed according to the instant invention, connected to a towing vehicle, such as an automobile, with the trailer having an elongate generally longitudinally extensible tongue disposed in a retracted position for towing purposes;

FIGURE 2 is a plan view of the extensible tongue of the trailer shown in FIGURE 1;

FIGURE 3 is a side elevational view of the extensible tongue of the trailer shown in FIGURES 1 and 2;

FIGURE 4 is a side elevational sectional view similar to FIGURE 3 of the drawing but showing the tongue in an extended position, and FIGURE 5 is a sectional view taken along line 5—5 of FIGURE 2 looking in the direction of the arrows showing the details of a latch assembly.

Attention is now directed to FIGURE 1 of the drawing wherein there is illustrated a wheel mounted ground supported vehicle 10, such as a trailer, suitable for being towed by a vehicle 12, such as an automobile or truck, with the trailer 10 being shown, for the purpose of illustration only, as being effective for carrying a boat 14 or the like.

A draft device or hitch 16, to be described and disclosed in more detail hereinafter, is provided for securing the trailer 10 to the vehicle 12.

The trailer 10 comprises a bed or frame structure 18 having a plurality of supports 20 mounted thereon for supporting and positioning a load, such as the boat 14 or the like.

Mounted to the trailer frame 18 adjacent the front end portion thereof is a generally upwardly extending bow support 24 for limiting forward movement of the load 14 on the trailer 10. Mounted to the bow support 24 adjacent the upper end portion thereof are a pair of generally outwardly and backwardly extending bow retainers 26.

Also mounted to the bow support 24 is a winch arrangement 28, which may be of any standard construction and design having a winch cable 30 and an operating handle 32. The winch cable 30 is designed to be removably affixed to the load 14 by means of a shackle or ring 34 mounted thereon. The winch arrangement 28 may be utilized to draw the load 14 onto the trailer body support structure 18–20 and to retain the load 14 thereon during towing.

The draft device or hitch 16 comprises an elongate generally longitudinally extensible tongue member 35 which may be mounted to the trailer frame 18 by means 36, such as a pair of pivot blocks which depend from the trailer frame 18, and a pivot pin or bolt 38 which passes through apertures in the extensible tongue member 35 and the pivot blocks 36. The pivot pin or bolt 38 is preferably readily removable to permit easy disassembly of the extensible tongue member 35, but may be, if desired, secured by a permanently assembled connection.

Refering now more particularly to FIGURES 2, 3 and 4, the extensible tongue member 35 comprises an outer member 40 and an inner member 42 telescopingly slidable within the outer member 40 with the forward end portion 44 of the inner member 42 projecting generally longitudinally outwardly beyond the forward end 46 of the outer telescoping member 40. In practice, it has been found that square tubing is especially suitable for both the inner telescoping member 40 and the outer telescoping member 42 since the utilization of such square tubing for these members inherently provides torsional stability for the tongue member 35. Tubing having other shaped cross-sections, or channel sections may be used, however, including tubing having a circular cross-section. If a tubing having a circular cross-section is utilized, it is desirable to provide other means for providing torsional stability in any well known manner.

A female part 48 is provided for the draft device or hitch coupling 16, which may be of any standard construction and design, and the part 48 may be secured to the forward end portion 44 of the inner telescoping member 42 in any conventional manner, as by welding for a permanent connection or by means of threaded fasteners for a removable connection. The female part 48 of the draft device or hitch coupling 16 is so constructed and arranged as to be capable of mating with a male part 50 carried by the towing vehicle 12.

The rearward end 52 of the outer telescoping member 40 is provided with laterally aligned apertures 54 to receive the pivot pin 38 which also passes through apertures 56 in the pivot blocks 36 to pivotally secure the outer telescoping member 40 of the extensible tongue member 35 to the trailer frame 18 of the vehicle 10.

The pivot pin 38 may, as stated above, be permanently affixed to the pivot blocks 36 or to the outer telescoping member 40 of the extensible tongue member 35, but is preferably removable to enable easy disassembly of the extensible tongue member 35 from the vehicle 10. Accordingly, the pivot pin 38 may be a bolt 58 secured within the apertures 54 and 56 by means of a nut 60. The pivot pin 38 may, as is readily apparent, comprise an unthreaded bar, having an enlarged head at one end thereof secured at the other end thereof by a cotter pin or may be secured at both ends by means of cotter pins or nuts, as desired.

A latch assembly 62 is attached to the outer telescoping member 40 of the tongue member 35 near the forward end 46 thereof to latch the inner telescoping member 42 and the outer telescoping member 44 in either the retracted or the extended positions thereof.

With reference now especially to FIGURE 5, the latch assembly 62 comprises a frame member 64, which may be constructed of a U-shaped channel section or the like, having the leg portions affixed to the outer telescoping member 40, as by welding, or the like. An aperture 66 is provided in the bight portion of the frame member 64 to receive a lock pin 68 which is slidable therein. The lock pin 68 comprises a handle portion 70 at the upper end portion thereof and an elongate bolt portion 74, preferably terminating in a conical portion 76 at the other end thereof.

The outer telescoping member 40 is provided with a clearance hole 78 to permit the bolt portion 74 of the lock pin 68 to pass therethrough into engagement with either of a plurality of apertures 80–82 provided in the adjacent surface of the inner telescoping member 42. The lock pin 68 is so constructed and arranged as to enable the conical termination portion 76 thereof to pass through the selected one of the apertures 80–82 of the inner telescoping member 42 to permit the bolt portion 74 of the lock pin 68 to securely position the inner telescoping member 42 relative to the outer telescoping member 40 in either the extended position as shown in FIGURE 4 or in the retracted position as shown in FIGURE 3.

If desired, the aperture 82 in the inner member 42 of the tongue member 35 may be generally longitudinally elongated, as illustrated, to enable the lock pin 68 to be more easily inserted thereinto since less rigidity of the draft device or hitch 16 is required when the tongue member 35 is in the extended position.

A compression spring 84 is provided within the frame member 64 of the latch assembly 62 to bear against an upper washer 86 slidably mounted on the lock pin 68 and against a lower washer 88 affixed to the lock pin 68 as by welding, staking, or a threaded connection, to bias the lock pin 68 towards insertion into the respective apertures 80–82 of the inner telescoping member 42.

Safety chains 90 are provided at the forward end 44 of the inner telescoping member 42 and at the forward end 46 of the outer telescoping member 40 with the chains 90 being secured to the towing vehicle 12 in any standard manner during towing of the trailer 10 over land as may be required by safety regulations.

In order to prevent the inner 42 and the outer 40 members of the tongue member 35 from becoming disassembled during the extension and retraction of the tongue member 35, there is provided a stop arrangement 91 which comprises a bodily flexible member 92, such as a chain, cable, or the like, having one end portion thereof secured to the rearward end 94 of the inner telescoping member 42 as by a shackle 96. The other end portion of the bodily flexible member 92 is secured to the rearward end 98 of the outer telescoping member 40 so that the bodily flexible member 92 may limit the length or amount of longitudinal extent of the tongue member 35 and prevent the inner telescoping member 42 from becoming disassembled from the outer telescoping member 40. The bodily flexible member 92 is preferably of such a length as not to be under any tensile stress during towing of the trailer 10 by the towing vehicle 12 when the extensible tongue member 35 is properly latched in the extended position by the latch assembly 62, as shown in FIGURE 4, but to function rather as a safety device in the event of improper operation of the latch assembly 62. It is further desirable, however, that the length of the bodily flexible member 92 be selected as to enable it to be utilized to initially position the inner telescoping member 42 relative to the outer telescoping member 40 prior to engagement of the lock pin 68 of the latch assembly 64 with the selected one of the apertures 80–82 of the inner telescoping member 42 when extending the extensible tongue member 35.

The bodily flexible member 92 may be attached at the rearward end thereof to the pivot pin 38 or directly to the rearward end 98 of the outer telescoping member 40. The bodily flexible member 92 is preferably, however, removably attached to the pivot pin 38 as by means of a securement 100 around the pivot pin 38.

If the bodily flexible member 92 is removably attached to the pivot pin 38, and if the pivot pin 38 is removable, then removal of the pivot pin 38 allows the complete disassembly of the extensible tongue member 35 for inspection, maintenance or the like.

In operation, when it is desired to tow the trailer 10 over land, the extensible tongue member 35 is positioned in the retracted position as shown in FIGURES 2 and 3, with the conical portion 76 of the bolt portion 74 of the latch assembly 62 being inserted in the forward aperture 80 of the inner telescoping member 42 to secure the tongue member 35 in the retracted position thereof.

When it is desired to launch the load or boat 14 from the trailer 10, the handle portion 70 of the latch assembly 62 may be pulled upwardly and outwardly against the bias of the compression spring 84 to extract the conical portion 76 of the latch assembly 62 from the aperture 80 of the inner telescoping member 42, thus permitting the inner telescoping member 42 to be withdrawn from the outer telescoping member 40 to extend the tongue member 35 until the bolt portion 74 of the latch assembly 62 is positioned adjacent the elongate aperture 82 of the inner telescoping member 42.

As the conical termination 76 of the bolt portion 74 engages the rear elongate aperture 82 of the inner telescoping member 42, the compression spring 84 will bias the conical portion 76 into the rear elongate aperture 82 of the inner telescoping member 42 to retain the tongue member 35 in the extended position. As the towing vehicle 12 is backed up, the trailer 10 and the load or boat 14 may be backed into the water while the towing vehicle 12 remains on dry land. The pivotal connection, formed by the pivot blocks 36, outer telescoping member 40 and pivot pin 38 allows the trailer 10 and the boat 14 to be backed over a relatively steep embankment and into the water without applying an upward stress to the rear portion of the towing vehicle 12, as would occur in the absence of such a pivotal connection.

When it is desired to return the extensible tongue member 35 to the retracted position, as shown in FIGURES 2 and 3, for over land travel, the sequence of operation is reversed, so that the lock pin 68 will be inserted within the forward aperture 80 of the inner telescoping member 42 to retain the tongue member 35 in the retracted position.

While the invention has been described and illustrated with the inner telescoping member 42 carrying the female part 48 of the draft device or hitch coupling 16 and with the outer telescoping member 40 pivotally connected to the trailer frame 18, it should be readily apparent that this construction may be reversed, so that the outer telescoping member 40 carries the female part 48 and the inner telescoping member 42 is pivotally connected to the trailer frame 18.

While the invention has been shown, illustrated described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

I claim as my invention:

1. A load carrying trailer comprising:
    a wheeled load carrying frame;
    an extensible draft tongue; and
    means pivotally mounting the draft tongue on the frame of the trailer comprising
        a removable pivot pin;
        the extensible draft tongue comprising:
            an elongate outer member;
            an elongate inner member slidably telescopingly received in the outer member;
            one of the members pivotally receiving the pivot pin;
            a latch assembly associated with the members to enable the inner member to be secured in a plurality of positions relative to the outer member; and
            safety stop means comprising
                an elongate limit element secured adjacent one end portion thereof to the other of the members and slidably receiving the pivot pin adjoint the other end portion thereof to provide for ready disassembly of the draft tongue from the frame of the trailer by removal of the pivot pin and for ready disassembly of the extensible draft tongue.

2. The trailer of claim 1 wherein
    the elongate limit element comprises a bodily flexible member.

3. The trailer of claim 1 wherein
    the elongate limit element comprises a metal chain.

4. An extensible draft tongue for connecting a towed vehicle to a towing vehicle comprising:
    an elongate outer member;
    an elongate inner member slidably telescopingly received in the outer member;
    one end of one of the members being configured to receive a pivot pin which may be adapted to secure the draft tongue to such towed vehicle;
    a pivot pin received in the one member;
    a latch assembly associated with the members to enable the inner member to be secured in a plurality of positions relative to the outer member; and
    safety stop means comprising
        an elongate limit element secured adjacent one end portion thereof to the other of the members and slidably receiving the pivot pin at a location adjoint the other end portion thereof to provide for ready assembly and disassembly of the draft tongue and such towed vehicle and for ready disassembly of the extensible tongue.

References Cited

UNITED STATES PATENTS

| | | | |
|---|---|---|---|
| 2,451,698 | 10/1948 | Swinehart | 280—482 |
| 2,591,312 | 4/1952 | Stees | 287—58 |
| 2,658,769 | 11/1953 | Forney | 280—482 |
| 2,810,589 | 10/1957 | Tarleton | 280—414 |
| 2,992,845 | 7/1961 | Blanchard | 287—58 |
| 3,032,353 | 5/1962 | Williams et al. | 280—414 |
| 3,061,124 | 10/1962 | Schueller | 214—506 |
| 3,142,494 | 7/1964 | Kelley | 280—414 |
| 3,235,296 | 2/1966 | Day | 287—58 |

LEO FRIAGLIA, *Primary Examiner.*